United States Patent
Dubois

(10) Patent No.: US 8,699,033 B2
(45) Date of Patent: Apr. 15, 2014

(54) HOLOGRAPHIC MICROSCOPY AND METHOD TO INVESTIGATE NANO-SIZED OBJECTS

(75) Inventor: Frank Dubois, Brussels (BE)

(73) Assignee: Universite Libre de Bruxelles, Brussels (BE)

( * ) Notice: Subject to any disclaimer, the term of this patent is extended or adjusted under 35 U.S.C. 154(b) by 368 days.

(21) Appl. No.: 13/059,571

(22) PCT Filed: Oct. 2, 2009

(86) PCT No.: PCT/EP2009/062854
§ 371 (c)(1),
(2), (4) Date: Feb. 17, 2011

(87) PCT Pub. No.: WO2010/037861
PCT Pub. Date: Apr. 8, 2010

(65) Prior Publication Data
US 2011/0141273 A1   Jun. 16, 2011

(30) Foreign Application Priority Data
Oct. 3, 2008 (EP) .................... 08165820

(51) Int. Cl.
*G01B 9/021* (2006.01)
(52) U.S. Cl.
USPC ....................................... 356/457
(58) Field of Classification Search
USPC ....................................... 356/457
See application file for complete search history.

(56) References Cited

U.S. PATENT DOCUMENTS

2006/0132799 A1 *   6/2006   Dubois et al. .............. 356/512

FOREIGN PATENT DOCUMENTS

WO   WO 2004/102111 A1   11/2004

OTHER PUBLICATIONS

Holographic Digital Fourier Microscopy for Selective Imaging of Biological Tissue, arXiv:physics/0502017, Feb. 2005.*

(Continued)

*Primary Examiner* — Tarifur Chowdhury
*Assistant Examiner* — Jonathan Cook
(74) *Attorney, Agent, or Firm* — Merchant & Gould P.C.

(57) ABSTRACT

A method for detecting a three dimensional object smaller than 300 nm includes providing a light source producing a first light beam (1), the light source being at least partially coherent; and splitting the first light beam (1) into an object beam (2) and a reference beam (6) by a first beam splitter (BS1). An image of the light source is produced in a light source image plane by a first microscope objective (L1), in the optical path of the object beam (2). The three dimensional object to be detected in an object cell (3) is positioned in the optical path of the object beam (2), between the first beam splitter (BS1) and the first microscope objective (L1). The object beam (2) and the reference beam (6) are recombined into a recombined beam (8) by use of optical devices. An optical stop (4) is placed in the light source image plane of the microscope objective (L1) on the optical axis of the microscope objective (L1). Interferometric signals produced by the interaction between the reference beam and the object beam are recorded with a recording device (5). The recombined beam (8) is focused onto the recording device (5) with a focuser (L3). A three dimensional picture of the three dimensional object is reconstructed to be detected from the interferometric signal, thereby detecting the three dimensional object.

15 Claims, 3 Drawing Sheets

(56) References Cited

OTHER PUBLICATIONS

Dubois et al., "Dark-field digital holographic microscopy to investigate objects that are nanosized or smaller than the optical resolution," *Optics Letters* (2008) 33 (22): 2605-2607. XP-001520917.

Dubois et al., "Digital holographic microscopy for the three-dimensional dynamic analysis of in vitro cancer cell migration," *Journal of Biomedical Optics* (2006) 11 (5): 054032-1-054032-5. XP-002519769.

Liu et al., "All-in-one multifunctional optical microscope with a single holographic measurement," *Optical Engineering* (2008) 47 (8): 087001-1-087001-7. XP-007909721.

Dominguez Caballero, J.A., "MIT PhD Thesis: Digital holographic imaging of aquatic species," (Feb. 2006). XP-002519770.

Seet et al., "Optical scatter imaging using digital Fourier microscopy," *J. Phys. D: Appl. Phys.* (2005) 38 (19): 3590-3598. XP-020083377.

* cited by examiner

HOLOGRAPHIC MICROSCOPY AND METHOD TO INVESTIGATE NANO-SIZED OBJECTS

This application is a National Stage Application of PCT/EP2009/062854, filed 2 Oct. 2009, which claims benefit of Ser. No. 08165820.5, filed 3 Oct. 2008 in the EPO and which application are incorporated herein by reference. To the extent appropriate, a claim of priority is made to each of the above disclosed applications.

FIELD OF THE INVENTION

The present invention is related to a holographic microscope and a method to investigate nano-sized objects.

STATE OF THE ART

Digital holography microscopy (DHM), wherein the hologram is recorded with a CCD camera, constitutes an efficient tool to refocus, slice-by-slice, the depth images of a thick sample by digital reconstruction. DHM also provides quantitative phase contrast imaging with numerous applications as the observation of biological samples. The reconstruction in depth capability makes DHM powerful to implement 3D velocimetry. As digital holography provides the complex amplitude, powerful processes were implemented, as the automated refocusing, the aberration compensation, 3D pattern recognition, segmentation and border processing. The capability of DHM to record, in a short time, the volume information that can further be processed makes it possible to investigate fast phenomena with reduced time distortions. This is a decisive advantage for 3D velocimetry applications. For this purpose, several approaches were investigated, including the use of in-line holography. In bright field configurations, contrasted particle reconstructions by DHM can be expected when the particle size exceeds the resolution of system. However, in some circumstances, this condition is difficult to fulfil for practical reasons. In the case of sub-micron sized particles, the use of high numerical aperture lenses is often unrealistic due to the short working distance and, in some cases, the use of immersion oil lenses. Moreover, with the increasing use of nanometric objects for numerous applications, there are situations where the particles to be detected will be anyway smaller than the optical resolution limit that is about 300 nm. Therefore, there is a need for optical systems able to rapidly detect particles or objects smaller than the resolution limit of optical microscopy.

In the Ph.D. thesis of J. A. Dominguez Caballero "Digital holographic images of aquatic species", a dark filed digital holographic imaging system is disclosed. The disclosed system does not give any indication about the optimisation of the detection of object smaller than the resolution of the optical system.

AIMS OF THE INVENTION

The present invention aims to provide a holographic microscope that overcomes drawbacks of prior art holographic microscopes and a method to improve prior art methods.

More particularly, the present invention aims to provide a method of operating a transmission holographic microscope (HM) to detect 3D objects smaller than the classical limit of resolution of optical microscopy (300 nm).

SUMMARY OF THE INVENTION

The present invention is related to a holographic dark field microscope comprising:

a light source, said light source being at least partially coherent, and being able to produce a first light beam;

a first beam splitter arranged to split said first light beam into an object beam and a reference beam;

a first microscope objective, in the optical path of the object beam, able to produce an image of the light source in a light source image plane;

an object cell able to hold a specimen to be studied, positioned in the optical path of the object beam, between said first beam splitter and said first microscope objective;

optical means arranged to recombine said object beam and said reference beam into a recombined beam;

an optical stop located in said light source image plane of said microscope objective on the optical axis of said microscope objective;

recording means capable of recording interferometric signals produced by the interaction between the reference beam and the object beam;

focusing means for focusing said recombined beam onto said recording means.

Preferably, said optical stop is larger than the size of the image of the light source in the light source image plane of said microscope objective.

The microscope of the present invention can also preferably comprises an optical attenuator, inserted on the optical path of the reference beam. Preferably, said optical attenuator is a neutral density filter, Advantageously, said optical means comprises
a second beam splitter;
a first mirror arranged to direct the reference beam onto said second beam splitter;
a second mirror arranged to direct the object beam on said second beam splitter.

Advantageously, the optical transfer function of the optical path of the object beam without the specimen and without the optical stop, and of the reference beam without the neutral density filter are equivalent.

By optical transfer function, we mean in the present invention, a function, which, applied to the phase and amplitude in an input plane, calculates the phase and amplitude in an output plane.

Advantageously, the total optical path length of the object beam and of the reference beam are essentially equal.

Preferably, the microscope comprises compensation means arranged to compensate the difference of optical paths between the reference beam and the object beam, and to produce, in the absence of the specimen (9) and of the optical stop, essentially the same spatial phase dependency of object beam and reference beam on the recording means.

Advantageously, said compensation means comprises a second microscope objective placed in the optical path of said reference beam.

Preferably, the compensation means comprises a reference cell similar to the object cell but not including the specimen to be studied, or a transparent material of suitable thickness and suitable composition.

Advantageously, said light source is spatially or/and temporally partially coherent.

Advantageously, said recording means is a video camera, which can be preferably connected to computer processing and image analysis means, for processing said interferometric signals. Advantageously, the camera is a CCD camera or a CMOS camera Preferably, the holographic microscope further includes adjusting means able to align the different elements in suitable positions and angles.

Another aspect of the invention is related to a method for detecting a three dimensional object by means of a holographic microscope, said three dimensional object being smaller than the optical resolution of the holographic microscope, the method comprising the steps of:
- providing a light source producing a first light beam, said light source being at least partially coherent;
- splitting said first light beam into an object beam and a reference beam by means of a first beam splitter;
- producing a image of the light source in a light source image plane by means of a first microscope objective, in the optical path of the object beam;
- positioning the three dimensional object to be detected in an object cell in the optical path of the object beam, between said first beam splitter and said first microscope objective;
- recombining object beam and said reference beam into a recombined beam by use of optical means;
- placing an optical stop in said light source image plane of said microscope objective on the optical axis of said microscope objective;
- focusing said recombined beam onto said recording means with focusing means;
- recording interferometric signals produced by the interaction between the reference beam and the object beam with recording means, reconstructing a three dimensional picture of the three dimensional object to be detected from said interferometric signal, thereby detecting said three dimensional object.

By three dimensional picture, it is meant a three dimensional representation of the three dimensional object.

By optical resolution (OR) of the holographic microscope, it is meant the optical resolution of the first microscope objective. The optical resolution is defined as the ability of an imaging system to resolve detail in the object that is being imaged. The Rayleigh criterion is used in the present description, which represents the smallest distance between two points in the object plane for remaining distinguishable in the image plane. For microscopes, it can be estimated by the formula OR=$0.61\lambda$/NA. Where NA is the numerical aperture of the objective and $\lambda$ is the light wavelength.

According to particular preferred embodiments, the method of the present invention further discloses at least one or a suitable combination of the following features:
- the optical stop is larger than the size of the image of the light source in the light source image plane of said microscope objective;
- the method comprises the step of inserting an optical attenuator on the optical path of the reference beam;
- the optical means comprises:
    - a second beam splitter;
    - a first mirror arranged to direct the reference beam onto said second beam splitter;
    - a second mirror arranged to direct the object beam on said second beam splitter;
- the optical transfer function of the optical path of the object beam without the specimen and without the optical stop, and of the reference beam without the optical attenuator are essentially equivalent;
- the total optical path length of the object beam and of the reference beam are essentially equal.
- the method comprises the step of compensating the difference of optical paths between the reference beam and the object beam, and to produce, in the absence of the specimen and of the optical stop, essentially the same spatial phase dependency of object beam and reference beam on the recording means;
- the method comprises the step of inserting a second microscope objective in the optical path of said reference beam;
- a reference cell similar to the object cell but not including the specimen to be studied, or a transparent material of suitable thickness and suitable composition is inserted in the reference beam optical path, preferably close to the front focal plane of said second microscope objective;
- the light source is spatially partially coherent;
- the light source is temporally partially coherent;
- the recording means is a video camera, preferably, said video camera is a CCD or a CMOS camera;
- the video camera is connected to computer processing and image analysis means, for processing said interferometric signals;
- the three dimensional picture reconstruction is obtained by refocusing slice by slice the experimental volume in which the three dimensional object is distributed in order to be able to reconstruct a three dimensional picture;
- the method is used for the detection of three dimensional object smaller than the half of the wavelength of the light source, preferably smaller than 300 nm.

BRIEF DESCRIPTION OF THE DRAWINGS

FIG. 1b is representing a dark field intensity image recorded in focus—Zone Corresponding to 1a.

FIG. 1c is representing a dark field intensity image with a defocus distance of 60 μm—Zone corresponding to 1a.

FIG. 1d is representing a refocused dark field intensity image by digital holography of the digital hologram defocused by a distance of 60 μm—Zone corresponding to 1a.

DETAILED DESCRIPTION OF THE INVENTION

Figure 1:
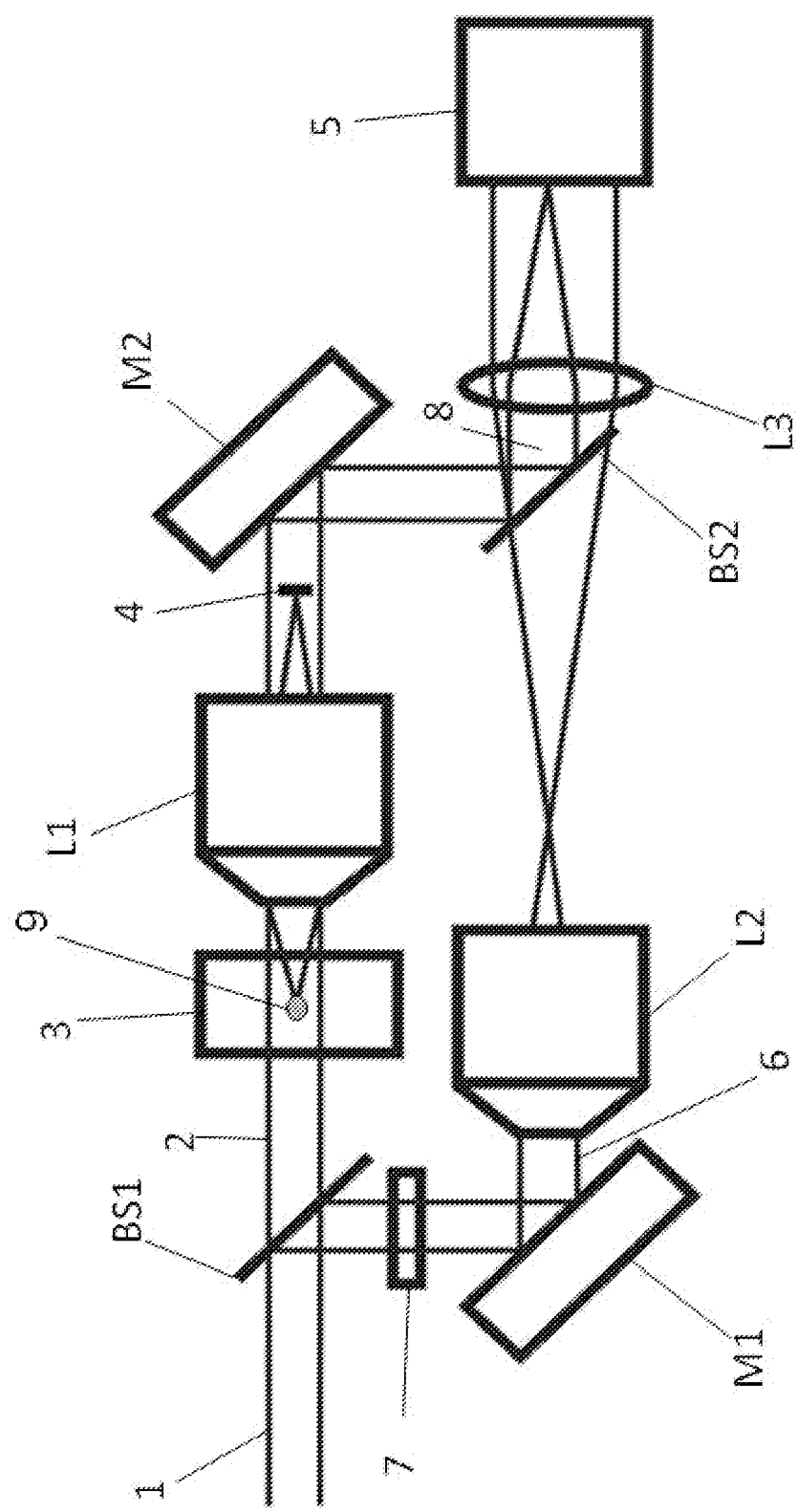
FIG. 1 is representing a dark field holographic microscope according to the present invention.

In order to outline the advantages provided by the dark field integration in DHM, we consider first the detection of an object smaller than the resolution limit of an imaging system working in transmission.

To record a digital hologram, a reference beam is interfering with an object beam on the sensor of a camera. The best image of an object that can be expected with a digital holographic reconstruction is the image of the object that should be recorded when it is at the focus distance.

Therefore, we analyse this imaging process. We consider a circular opaque particle of diameter d illuminated in transmission. It is imaged by a lens limited with a circular aperture of diameter D, and we assume than d is smaller than the resolution limit of the optical system defined by the Rayleigh criterion.

The distance between the object plane and the lens is denoted by a while the conjugated one between the lens and the image plane is b. The optical axis is denoted by z while the x and y axis are perpendicular to z. The position of the particle is located at the point $(x_0, y_0)$ in the object plane. For conciseness, we adopt the operator notations of Fourier optics [25].

Considering that the amplitude distribution in the object plane $u_0(x,y)$, the amplitude distribution in the imaging plane $u_1(x,y)$ is obtained by applying a linear operator T, $u_1(x,y) = Tu_0(x,y)$, in such a way that:

$$u_1 = BV\left[-\frac{a}{b}\right]Q\left[\frac{1}{a}\right]w(x,y)\left[\begin{array}{c} 1-\left(\frac{D}{2\lambda a}\right)^2 s(Fcirc) \\ \left(\frac{(x-x_0)D}{2\lambda a}, \frac{(y-y_0)D}{2\lambda a}\right) \end{array}\right] \quad (1)$$

Where B involves all the terms that are unimportant for the present discussion, V[ ] is the scaling operator defined by V[α]g(x,y)=g(αx,αy) that expresses the magnification of the optical system, s is the area of the particle, (Fcirc) denotes the Fourier transformations of the lens aperture, λ is the wavelength, Q[β] represents a quadratic phase factor defined by Q[β]=exp{j(kβ/2)(x²+y²)} with k=2π/λ and j=√−1 and where w(x,y) is the amplitude illumination of the object plane.

Eq. (1) shows that the image of the object has the shape, with a contrast reversal, of the impulse response of the optical system on a bright background. We see also that the modulation of the amplitude image is multiplied by the area s of the object. It results that the modulation is decreasing with this area and the available contrast becomes rapidly weak for particle smaller than the resolution limit. The modulation is further decreased when the object is defocused. This has two consequences: the available dynamics to record the object information is reduced, and, if the background suffers from noise, as it is almost always the case, the available signal is highly corrupted.

Therefore, it is expected that objects smaller than the resolution limit of the optical system become rapidly undetectable. The actual experiences show that the loss of detections happens very rapidly below the resolution of the optical system. That is the motivation to set a dark field system integrated in a digital holographic microscope to improve the detection capabilities.

The system that we implemented is described by the FIG. 1.

A light beam, that can be coherent or of partial coherence, is divided by the beam splitter BS1. The transmitted beam, the object beam, illuminates the object 9 in transmission and is incident on the microscope lens L1. An optical stop 4 is placed in such a way that, without object 9, the transmitted beam is blocked. On the contrary, when there is an object 9, a part of the diffracted light is not blocked by the optical stop and is incident on the camera sensor.

Therefore, the couple of lens L1-L3 performs the dark field image of the front focal plane of L1 on the CCD 5. The effect of the optical stop 4 is to remove the constant term in Eq. (1). Assuming that the optical stop weakly disturbs the imaged amplitude on the sensor, Eq. (1) gives:

$$u'_1 = B\left(\frac{D}{2\lambda a}\right)^2 sV\left[-\frac{a}{b}\right]Q\left[\frac{1}{a}\right]w(x,y)(Fcirc)\left(\begin{array}{c} \frac{(x-x_0)D}{2\lambda a}, \\ \frac{(y-y_0)D}{2\lambda a} \end{array}\right) \quad (2)$$

As there is no more background, the important aspect is that it becomes possible to adjust the sensitivity of the detection system in such a way that the full dynamical range of the recording system is exploited.

The beam reflected by BS1, the reference beam, is also redirected on the sensor of the CCD in such a way that we record the interference pattern between the object and the reference beam. A neutral density filter 7 allows adjusting the beam ratio to obtain high contrast fringe pattern.

The alignment of the system is set without object and without the optical stop to obtain an interference pattern to apply an off-axis holographic method for the computation of the object complex amplitude 25,26. When the alignment procedure is achieved, the optical stop 4 is placed.

As the complex amplitude is available by DHM, an object, represented by the amplitude $u_0$ that is recorded out of focus, can be refocused by computing the Kirchhoff Fresnel propagation equation over the defocus distance ε:

$$u_\epsilon(x',y') = \exp(jk\epsilon) F_{x',y'}^{+1} Q[-\lambda^2 \epsilon] F_{u,v}^{-1} u_0(x,y) \quad (3)$$

In addition to the refocusing capabilities provided by DHM, there is one additional advantage in using the dark field configuration. Consider the dark field amplitude distribution $u'_1$ of an object smaller than the resolution limit. For increasing defocus distance ε, the amplitude globally decreases as 1/ε while the intensity decreases as 1/ε². Therefore, the decrease is much faster in intensity than in amplitude.

As it is the amplitude that is actually provided by digital holography, regardless to its refocusing capabilities, it is possible to detect defocus objects over a range of distances that is significantly increased in comparison to intensity imaging.

EXAMPLE

To demonstrate the feasibility of the dark field DHM to detect in 3D particles smaller than the resolution limit, we inserted nanometric particles immersed in deionised distilled water between a microscopic slide and a cover-slit. The particles have an average size of 150 nm with a width of 20 nm. The DHM is equipped with ×10 microscope lenses (NA=0.3) that provide a resolution limit of 1.3 μm.

Figure 1A:
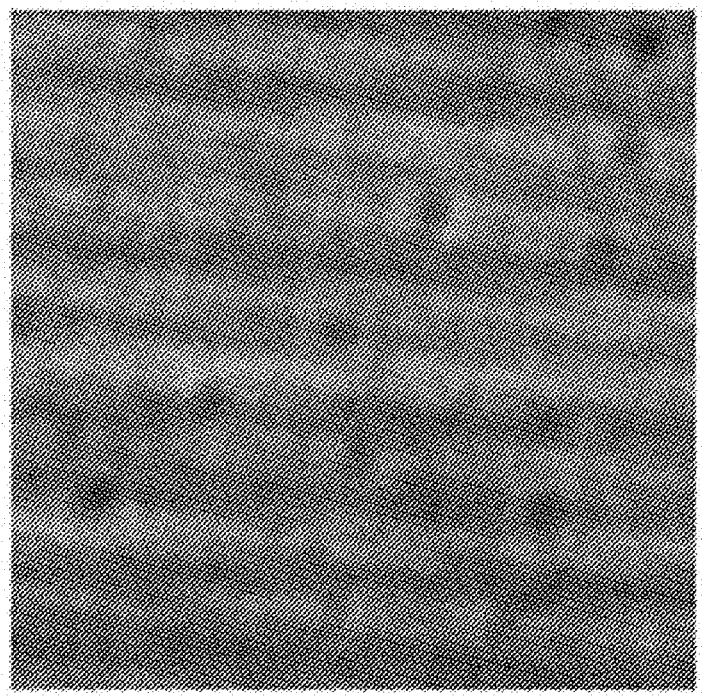
FIG. 1a is representing a bright field intensity image recorded in focus, according to prior art. (100×100 cropped zone of the original image)
Figure 1B:
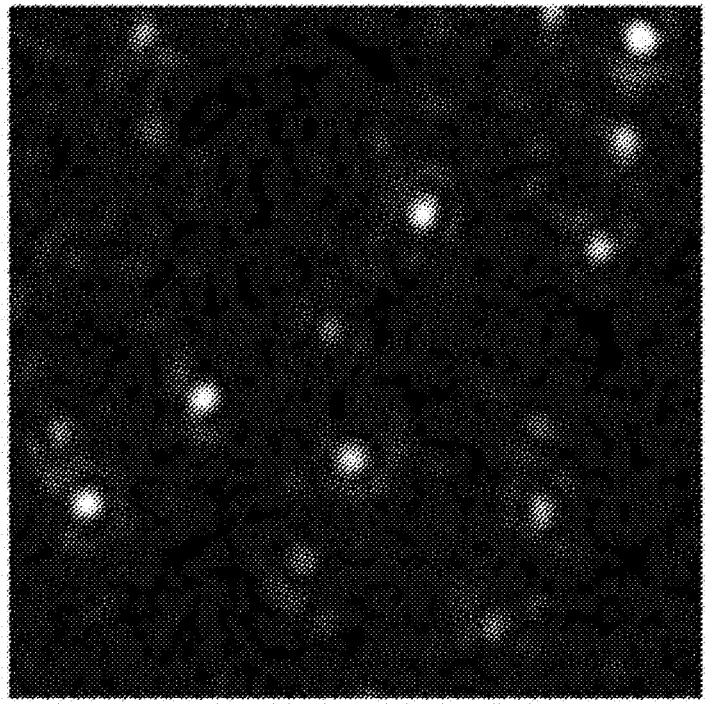
Figure 1D:
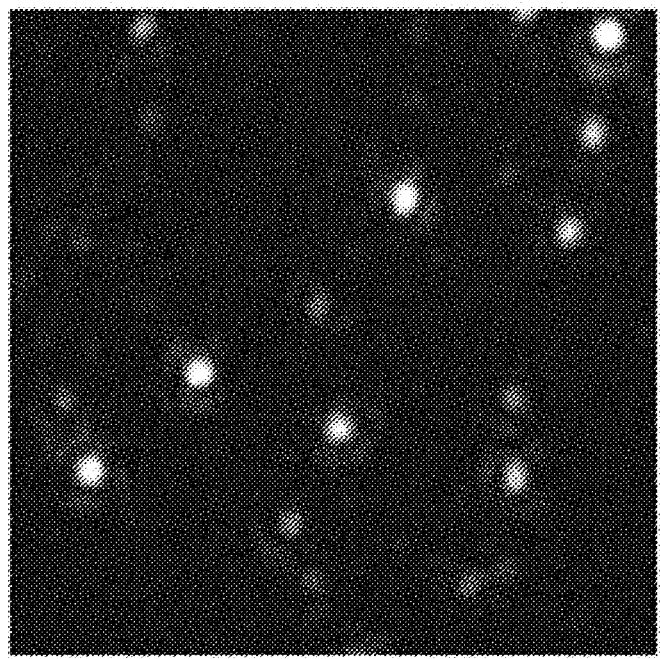

The original field of view is 525 μm×420 μm that is imaged on a CCD sensor of 1280×1024 pixels. We note that the size peak of the particles is 8 times smaller than the resolution limit. The particle intensity images were recorded focus in bright and dark field (FIGS. 1a, b). The hologram was recorded in dark field with a defocus distance of 60 μm and reconstructed over this distance. Its intensity image is provided by FIG. 1c. FIG. 1d shows the intensity of the refocused image by digital holography.

We observe, as expected that a large part of the particles in the FIG. 1a have a poor contrast in bright field. The better contrast obtained for some of them are due to aggregation of the particles. On the dark field image obtained in FIG. 1b, the particles that are almost invisible in the bright field image can be seen with a good contrast with respect to the background.

Figure 1C:
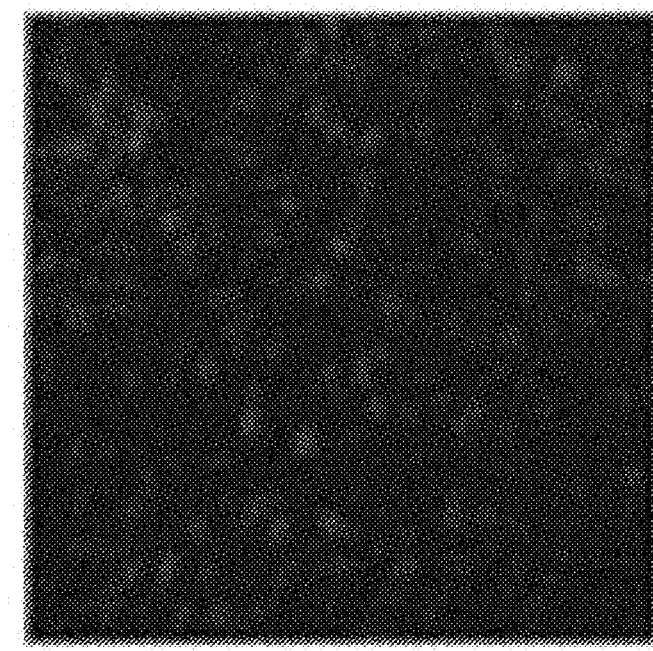

That confirms the increased detection capability provided by the dark field system. In FIG. 1c, the defocus makes impossible the detection of the particles. The digital holographic reconstruction shows the refocusing capability of the particles, and it can be seen that this image is very similar to the one that has been recorded in focus. That is demonstrating the feasibility of the dark field digital holography for the detection in 3D of particles that can be largely smaller than the resolution limit.

The invention claimed is:
1. Method for detecting a three dimensional object by a holographic microscope, said three dimensional object being smaller than the optical resolution of the holographic microscope, the method comprising the steps of:
   providing a light source producing a first light beam, said light source being at least partially coherent;
   splitting said first light beam into an object beam and a reference beam by a first beam splitter;

producing an image of the light source in a light source image plane by a first microscope objective, in the optical path of the object beam;

positioning the three dimensional object to be detected in an object cell in the optical path of the object beam, between said first beam splitter and said first microscope objective;

recombining object beam and said reference beam into a recombined beam by optical means;

placing an optical stop in said light source image plane of said microscope objective on the optical axis of said microscope objective;

focusing said recombined beam onto recording means with focusing means, thereby forming an image of an object plane to be detected;

recording interferometric signals produced by the interaction between the reference beam and the object beam with the recording means; and reconstructing a three dimensional picture of the three dimensional object to be detected from said interferometric signal, and detecting said three dimensional object.

2. Method of claim 1 wherein said optical stop is larger than the size of the image of the light source in the light source image plane of said microscope objective.

3. Method of claim 1, comprising the step of inserting an optical attenuator on the optical path of the reference beam.

4. Method of claim 1 wherein said optical means comprises a second beam splitter;

a first mirror arranged to direct the reference beam onto said second beam splitter;

a second mirror arranged to direct the object beam on said second beam splitter.

5. Method of claim 1 wherein the optical transfer function of the optical path of the object beam without a specimen and without the optical stop, and of the reference beam without an optical attenuator are essentially equivalent.

6. Method of claim 1 wherein a total optical path length of the object beam and of the reference beam are essentially equal.

7. Method of claim 1 comprising the step of compensating the difference of optical paths between the reference beam and the object beam, to produce, in the absence of the specimen and of the optical stop, essentially the same spatial phase dependency of object beam and reference beam on the recording means.

8. Method of claim 7 wherein the step of compensating the difference of optical paths between the reference beam and the object beam comprise the step of inserting a second microscope objective in the optical path of said reference beam.

9. Method according to claim 8 wherein a reference cell similar to the object cell but not including a specimen to be studied, or a transparent material of suitable thickness and suitable composition is inserted in the reference beam optical path.

10. Method according to claim 7 wherein a reference cell similar to the object cell but not including a specimen to be studied, or a transparent material of suitable thickness and suitable composition is inserted in the reference beam optical path.

11. Method of claim 1 wherein said light source is spatially partially coherent.

12. Method of claim 1 wherein said light source is temporally partially coherent.

13. Method of claim 1 wherein said recording means is a video camera.

14. Method of claims 13 wherein said video camera is a CCD or a CMOS camera.

15. Method of claim 13 wherein the video camera is connected to computer processing and image analysis means, for processing said interferometric signals.

* * * * *